US012559626B2

(12) United States Patent
Yoshioka et al.

(10) Patent No.: US 12,559,626 B2
(45) Date of Patent: Feb. 24, 2026

(54) RESIN COMPOSITION, HEAT-RADIATING MEMBER, AND ELECTRONIC APPARATUS

(71) Applicant: SEKISUI CHEMICAL CO., LTD., Osaka (JP)

(72) Inventors: Tetsurou Yoshioka, Kyoto (JP); Osamu Inui, Yao (JP); Hidehito Nishizawa, Takatsuki (JP); Izumi Matsumoto, Kyoto (JP); Abison Scaria, Takatsuki (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 501 days.

(21) Appl. No.: 17/916,632

(22) PCT Filed: Apr. 5, 2021

(86) PCT No.: PCT/JP2021/014525

§ 371 (c)(1),
(2) Date: Oct. 3, 2022

(87) PCT Pub. No.: WO2021/206064

PCT Pub. Date: Oct. 14, 2021

(65) Prior Publication Data

US 2023/0151216 A1 May 18, 2023

(30) Foreign Application Priority Data

Apr. 6, 2020 (JP) ................................ 2020-068593

(51) Int. Cl.

*C08L 83/04* (2006.01)
*C08K 3/04* (2006.01)
*C08K 3/22* (2006.01)
*C08K 3/28* (2006.01)

(52) U.S. Cl.

CPC ................ *C08L 83/04* (2013.01); *C08K 3/04* (2013.01); *C08K 2003/2227* (2013.01); *C08K 2003/282* (2013.01); *C08K 2201/001* (2013.01); *C08L 2203/20* (2013.01)

(58) Field of Classification Search

CPC ....... C08L 83/04; C08L 2203/20; C08K 3/04; C08K 2003/2227; C08K 2003/282; C08K 2201/001; C08K 3/22; C08K 3/28; C08G 77/12; C08G 77/20; C08G 77/38; C08G 77/18; C11D 17/0004; H01B 1/20

See application file for complete search history.

(56) References Cited

U.S. PATENT DOCUMENTS

| | | | |
|---|---|---|---|
| 6,306,957 B1 | 10/2001 | Nakano et al. | |
| 6,380,301 B1 | 4/2002 | Enami et al. | |
| 7,622,539 B2 | 11/2009 | Fukui et al. | |
| 7,692,032 B2 | 4/2010 | Hoshino | |
| 8,119,758 B2 | 2/2012 | Sakurai et al. | |
| 2007/0185259 A1 | 8/2007 | Hoshino | |
| 2008/0057325 A1 | 3/2008 | Sakurai et al. | |
| 2008/0085966 A1 | 4/2008 | Fukui et al. | |
| 2016/0251555 A1* | 9/2016 | Iwata | H10H 20/857 252/75 |
| 2018/0016419 A1* | 1/2018 | Shimizu | C08L 23/14 |
| 2018/0179383 A1 | 6/2018 | Minorikawa et al. | |
| 2020/0140736 A1 | 5/2020 | Takenaka et al. | |
| 2022/0267533 A1 | 8/2022 | Sakamoto et al. | |

FOREIGN PATENT DOCUMENTS

| | | |
|---|---|---|
| CN | 103087351 | 5/2013 |
| CN | 105837822 | 8/2016 |
| CN | 107849354 | 3/2018 |
| CN | 109504340 | 3/2019 |
| CN | 110746926 | 2/2020 |
| JP | 2000-256558 | 9/2000 |
| JP | 2001-139815 | 5/2001 |
| JP | 3415999 | 6/2003 |
| JP | 2006-169411 | 6/2006 |
| JP | 2008-280395 | 11/2008 |
| JP | 2010-100784 | 5/2010 |
| JP | 4514058 | 7/2010 |
| JP | 4745058 | 8/2011 |
| JP | 2016-098337 | 5/2016 |
| JP | 2018-027997 | 2/2018 |
| JP | 2019-182980 | 10/2019 |
| JP | 2020-063380 | 4/2020 |
| KR | 10-2020-0016262 | 2/2020 |
| TW | 200634056 | 10/2006 |
| WO | 2020/262449 | 12/2020 |

OTHER PUBLICATIONS

International Search Report (ISR) issued Jun. 22, 2021 in International (PCT) Application No. PCT/JP2021/014525.

* cited by examiner

*Primary Examiner* — Mark Eashoo
*Assistant Examiner* — Zhen Liu
(74) *Attorney, Agent, or Firm* — Wenderoth, Lind & Ponack, L.L.P.

(57) ABSTRACT

A resin composition of the present invention comprises: a silicone resin or a silicone oil (A), a compound (B) having a particular structure, and a thermally conductive filler (C). According to the present invention, a resin composition having favorable thermally conductive properties and exhibiting small physical property changes at high temperatures can be provided.

11 Claims, No Drawings

RESIN COMPOSITION, HEAT-RADIATING MEMBER, AND ELECTRONIC APPARATUS

TECHNICAL FIELD

The present invention relates to a resin composition, a heat radiation member formed with the composition, and an electronic component comprising the heat radiation member.

BACKGROUND ART

In recent years, countermeasures against heat have become important in electronic devices because of increases in calorific values accompanying high integration of circuits, and demands for heat radiation members for the countermeasures against heat have been growing. The forms of the heat radiation members include a sheet and grease. Particularly in recent years, a heat radiation member obtained by highly filling a silicone resin with a thermally conductive filler, such as alumina, has often been used for the purpose of high heat radiation.

When attempts such that a thermally conductive filler is highly filled in silicone which is a binder are made in order to obtain a heat radiation member having high thermally conductive properties, the fluidity is lowered with a decrease in the amount of the silicone. In order to solve such a problem, methods of surface-treating a thermally conductive filler using various surface treatment agents (such as an alkoxysilane and an alkoxy group-containing organopolysiloxane) are known.

For example, PTL1 to PTL3 describe invention relating to a thermally conductive silicone composition comprising a silicone resin, a thermally conductive filler, and an organopolysiloxane having a hydrolytic group.

CITATION LIST

Patent Literature

PTL1: JP 2000-256558 A
PTL2: JP 4745058 B
PTL3: JP 4514058 B

SUMMARY OF INVENTION

Technical Problem

With regard to thermally conductive silicone compositions which have been conventionally used, lowering of the fluidity in adding a thermally conductive filler to silicone cannot be improved sufficiently, and therefore it may be difficult to improve the thermal conductivity to a desired value. Further, physical property changes in the compositions at high temperatures are likely to occur in that the viscosity of the compositions at high temperatures becomes high with time, or the hardness after curing the compositions increases with time, and therefore there is room for improvements. Furthermore, with regard to thermally conductive fillers whose surface functional groups have low activity, it is difficult to obtain a sufficient effect of lowering the viscosity with a conventional surface treatment agent.

Accordingly, an object of the present invention is to provide a resin composition having a favorable thermal conductivity and exhibiting small physical property changes at high temperatures, a heat radiation member formed with the composition, and an electronic device comprising the heat radiation member.

Solution to Problem

As a result of making diligent studies in order to achieve the object, the present inventors have found that the problems can be solved by a resin composition comprising a silicone resin or a silicone oil, a thermally conductive filler, and a particular compound, and thereby completed the present invention.

That is, the present invention relates [1] to [11] described below.

[1] A resin composition comprising: a silicone resin or a silicone oil (A); a compound (B) represented by the following formula (1) or (2); and a thermally conductive filler (C):

(1)

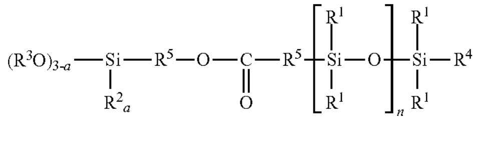

(2)

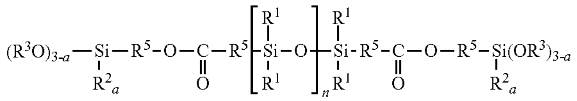

in the formulas (1) and (2), $R^1$ represents a C1-20 alkyl group, a C2-20 alkenyl group, or a C6-20 aryl group, a plurality of $R^1$s are optionally the same or different, $R^2$ represents a C1-4 alkyl group, when a plurality of $R^2$s are present, the plurality of $R^2$s are optionally the same or different, $R^3$ represents a C1-4 alkyl group, a C2-4 alkoxyalkyl group, or a C2-4 alkenyl group or acyl group, when a plurality of $R^3$s are present, the plurality of $R^3$s are optionally the same or different, $R^4$ represents a C1-8 alkyl group, $R^5$ represents a C2-20 alkylene group, a plurality of $R^5$s are optionally the same or different, a represents an integer of 0 to 2, and n represents an integer of 4 to 150.

[2] The resin composition according to [1], wherein the thermally conductive filler (C) is at least one or more selected from the group consisting of metal oxides, metal nitrides, carbides, carbon-based materials, and metal hydroxides.

[3] The resin composition according to [1] or [2], wherein the thermally conductive filler (C) is at least one or more selected from the group consisting of alumina, diamond, and aluminum nitride.

[4] The resin composition according to any one of [1] to [3], wherein the thermally conductive filler (C) comprises two or more types of particles having different average particle sizes.

[5] The resin composition according to any one of [1] to [4], wherein the silicone resin (A) is an addition reaction-curable silicone resin.

[6] A compound (B) represented by the following formula (1) or (2):

(1)

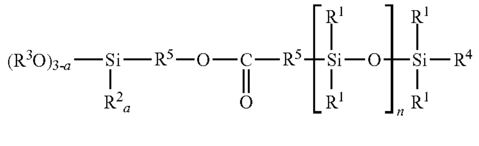

-continued (2)

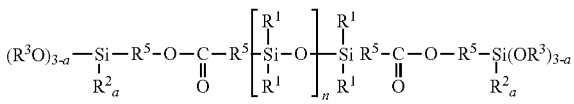

in the formulas (1) and (2), $R^1$ represents a C1-20 alkyl group, a C2-20 alkenyl group, or a C6-20 aryl group, a plurality of $R^1$s are optionally the same or different, $R^2$ represents a C1-4 alkyl group, when a plurality of $R^2$s are present, the plurality of $R^2$s are optionally the same or different, $R^3$ represents a C1-4 alkyl group, a C2-4 alkoxyalkyl group, or a C2-4 alkenyl group or acyl group, when a plurality of $R^3$s are present, the plurality of $R^3$s are optionally the same or different, $R^4$ represents a C1-8 alkyl group, $R^5$ represents a C2-20 alkylene group, a plurality of $R^5$s are optionally the same or different, a represents an integer of 0 to 2, and n represents an integer of 4 to 150.

[7] The compound (B) according to [6], to be used as a dispersant.

[8] A thermally conductive filler surface-treated with the compound (B) according to [6] or [7].

[9] A resin composition comprising: a silicone resin or a silicone oil (A); and the compound (B) according to [6] or [7].

[10] A heat radiation member formed with the resin composition according to any one of [1] to [5].

[11] An electronic device comprising: an electronic component; and the heat radiation member according to [9], disposed on the electronic component.

Effects of Invention

The present invention provides a resin composition having favorable thermally conductive properties and exhibiting small physical property changes at high temperatures, a heat radiation member formed with the resin composition, and an electronic device comprising the heat radiation member.

DESCRIPTION OF EMBODIMENTS

A resin composition of the present invention is a resin composition comprising a silicone resin or a silicone oil (A), a compound (B) represented by the following formula (1) or (2), and a thermally conductive filler (C).

(1)

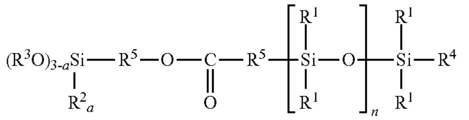

(2)

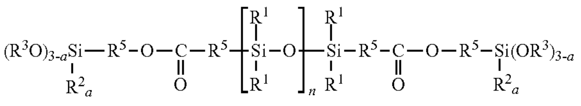

In the formulas (1) and (2), $R^1$ represents a C1-20 alkyl group, a C2-20 alkenyl group, or a C6-20 aryl group, and a plurality of $R^1$s are optionally the same or different. $R^2$ represents a C1-4 alkyl group, and when a plurality of $R^2$s are present, the plurality of $R^2$s are optionally the same or different. $R^3$ represents a C1-4 alkyl group, a C2-4 alkoxyalkyl group, or a C2-4 alkenyl group or acyl group, and when a plurality of $R^3$s are present, the plurality of $R^3$s are optionally the same or different. $R^1$ represents a C1-8 alkyl group, $R^5$ represents a C2-20 alkylene group, a plurality of $R^5$s are optionally the same or different, a represents an integer of 0 to 2, and n represents an integer of 4 to 150.

<Compound (B) Represented by Formula (1) or (2) (Compound (B))>

The present invention uses a compound (B) represented by formula (1) or (2) (hereinafter, sometimes simply described as compound (B)). By using the compound (B), a surface treatment, which will be described later, on the thermally conductive filler (C) is performed. Thereby, the dispersibility of the thermally conductive filler (C) in the resin composition is made favorable, and as a result, the thermally conductive filler (C) can be highly filled, so that the thermally conductive properties are enhanced. That is, the compound (B) functions as a dispersant for the thermally conductive filler. Therefore, the compound (B) can be used as a dispersant.

In addition, by using the compound (B) of the present invention, physical property changes in the resin composition at high temperatures can be suppressed. It is inferred that this is due to the ester structure of the compound (B). As shown in the following chemical equation, it is known that a compound having an ester bond and having divalent or higher carbon around the ester bond generally undergoes β cleavage as pyrolysis behavior through a six-membered ring intermediate structure and through abstraction of hydrogen at a γ-position with respect to a carbonyl group. For that reason, the chemical structure obtained by the pyrolysis takes a structure of a carboxylic acid and exhibits high hydrogen bonding ability, and therefore interacts with a hydroxy group on the surface of a metal oxide and an alkoxy group that is not forming a bond with a filler, so that volatilization can be prevented.

[Formula 7]

[Formula 7]

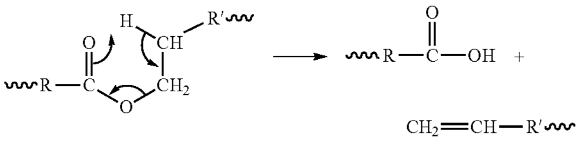

In addition, when the ester bond forms a hydrogen bond with a hydroxy group on the surface of a metal oxide, a carbonyl group on the surface of a carbon-based material, or the like, thereby a dispersion effect that is higher than that of a conventional surface treatment agent having only an alkoxysilane can be obtained.

In the compound (B), the compound represented by formula (1) is as follows.

(1)

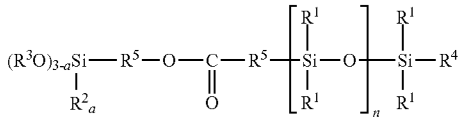

In the formula (1), $R^1$ represents a C1-20 alkyl group, a C2-20 alkenyl group, or a C6-20 aryl group, and a plurality of $R^1$s are optionally the same or different. In addition, each of the alkyl group and the alkenyl group is optionally linear or branched. Among these, $R^1$ is preferably a C1-20 alkyl group, more preferably a C1-4 alkyl group, still more preferably a methyl group.

In the formula (1), $R^2$ represents a C1-4 alkyl group, and when a plurality of $R^2$s are present (that is, when a is equal to 2), the plurality of $R^2$s are optionally the same or different. In addition, the alkyl group is optionally linear or branched. Among these, $R^2$ is preferably a C1-2 alkyl group, more preferably a methyl group. Further, a represents an integer of 0 to 2, and is preferably equal to 0 or 1, more preferably 0.

In the formula (1), $R^3$ represents a C1-4 alkyl group, a C2-4 alkoxyalkyl group, or a C2-4 alkenyl group or acyl group, and when a plurality of $R^3$s are present (that is, when a is equal to 0 or 1), the plurality of R-s are optionally the same or different. In addition, each of the alkyl group, the alkoxyalkyl group, the alkenyl group, and the acyl group in $R^3$s is optionally linear or branched. Among these, $R^3$ is preferably a C1-4 alkyl group and is more preferably a methyl group among others.

In the formula (1), $R^5$ represents a C1-8 alkyl group, preferably a C2-6 alkyl group, more preferably a butyl group.

In the formula (1), $R^3$ represents a C2-20 alkylene group, and a plurality of $R^5$s are optionally the same or different. In addition, the alkylene group is optionally linear or branched. $R^5$ is preferably a C2-10 alkylene group, more preferably a C2-8 alkylene group, still more preferably a C2-4 alkylene group, even still more preferably an alkylene group represented by $-CH_2-CH_2-CH$ or $-CH(CH_3)-CH_2-$.

In the formula (1), n represents the number of repetition and represents an integer of 4 to 150, preferably an integer of 5 to 120, more preferably an integer of 9 to 130, still more preferably 8 to 50. When n is in the range, the dispersibility of the thermally conductive filler can be improved in a relatively small amount, and further, the physical property changes at high temperatures can be made small.

Among the compounds represented by the formula (1), a compound shown below is particularly preferable from the viewpoint of enhancing the dispersibility of the thermally conductive filler and obtaining a resin composition exhibiting small physical property changes at high temperatures.

[Formula 9]

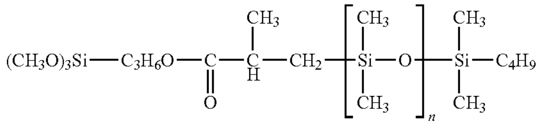

wherein n represents an integer of 4 to 150.

In the compound (B), the compound represented by formula (2) is as follows.

(2)

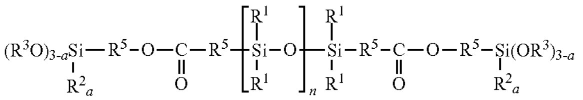

wherein $R^1$, $R^2$, $R^3$, $R^5$, n, and a are synonymous with those in the formula (1).

Among the compounds represented by the formula (2), a compound shown below is particularly preferable from the viewpoint of enhancing the dispersibility of the thermally conductive filler and obtaining a resin composition exhibiting small physical property changes at high temperatures.

[Formula 11]

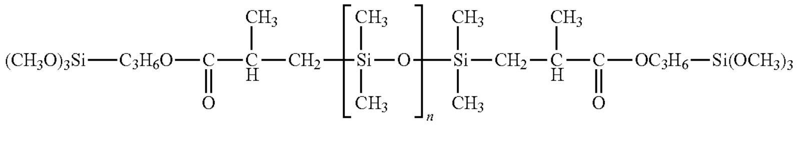

wherein n represents an integer of 4 to 150.

The amount of the compound (B) to be added is preferably 0.1 to 20 parts by mass, more preferably 0.5 to 15 parts by mass, still more preferably 1 to 10 parts by mass, based on 100 parts by mass of the thermally conductive filler (C). When the amount to be added is as just described above, the surface treatment on the thermally conductive filler (C) with the compound (B) is performed properly, making it easy to improve the dispersibility of the thermally conductive filler (C).

<Method for Producing Compound (B)>

The method for producing the compound (B) in the present invention is not particularly limited, and the compound represented by the formula (1) can be obtained by, for example, a hydrosilylation reaction between a compound represented by the following formula (3) and a compound represented by the following formula (4).

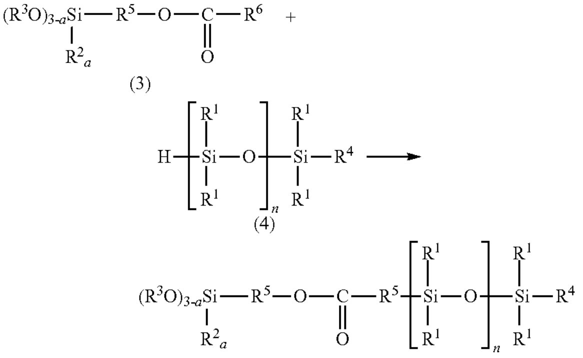

(3) (4) (1)

wherein, $R^1$ to $R^5$, n, and a in formulas (3) and (4) are synonymous with those in formula (1); $R^6$ in formula (3) represents a C2-10 alkenyl group and is preferably a C2-4 alkenyl group, more preferably a group represented by $-C(CH_3)=CH_2$; and $R^6$ represents a group that reacts with SiH in formula (4) to give $R^5$.

The hydrosilylation reaction between the compound represented by formula (3) and the compound represented by formula (4) is performed using a hydrosilylation catalyst. The hydrosilylation catalyst is not particularly limited as long as it is a catalyst that is generally used in a hydrosilylation reaction, and for example, a platinum catalyst, such as a single substance of platinum or a catalyst such that platinum is carried on a carrier, such as alumina, silica or carbon black can be used.

The hydrosilylation reaction between the compound represented by formula (3) and the compound represented by formula (4) may be performed in the presence of a solvent or may be performed in the absence of a solvent. When the reaction is performed in the presence of a solvent, the solvent can be, for example, toluene, hexane, or acetone. The reaction temperature is preferably 70 to 150° C., and the reaction time is preferably 0.5 to 2 hours. The ratio of amounts of the compound represented by formula (4) to the compound represented by formula (3) is not particularly limited, but is preferably 0.9 to 1.1 mol of the compound represented by formula (4) to 0.9 to 1.1 mol of the compound represented by formula (3).

The compound represented by the formula (2) can be obtained by a hydrosilylation reaction between a compound represented by the following formula (3) and a compound represented by the following formula (5).

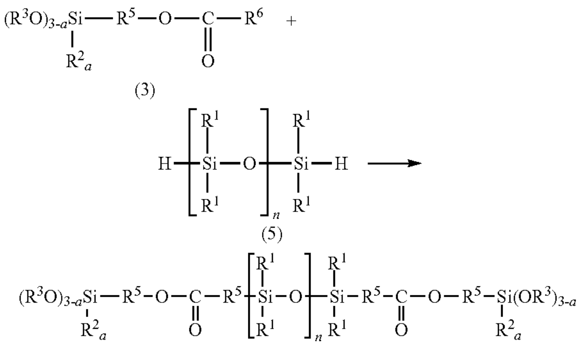

(3)

(5)

(2)

wherein $R^1$, $R^2$, $R^3$, $R^5$, n, and a in formulas (3) and (5) are synonymous with those in formula (1); $R^6$ in formula (3) represents a C2-10 alkenyl group and is preferably a C2-4 alkenyl group, more preferably a group represented by $-C(CH_3){=}CH_2$; and $R^6$ represents a group that reacts with SiH in formula (5) to give $R^5$.

The reaction conditions, such as the catalyst that is used in the hydrosilylation reaction between the compound represented by formula (3) and the compound represented by formula (5), the reaction temperature, the reaction time, and the solvent that is used when the reaction is performed in the presence of the solvent are the same as those in the above-described hydrosilylation reaction between the compound represented by formula (3) and the compound represented by formula (4).

The ratio of amounts of the compound represented by formula (5) to the compound represented by formula (3) is not particularly limited, but is preferably 0.9 to 1.1 mol of the compound represented by formula (5) to 1.8 to 2.2 mol of the compound represented by formula (3).

<Thermally Conductive Filler (C)>

In the present invention, the thermally conductive filler (C) is used. The thermally conductive filler (C) is a thermally conductive filler surface-treated with the compound (B), and thereby the dispersibility in the resin composition or in a cured product of the resin composition is improved, so that the thermal conductivity can be enhanced.

The thermally conductive filler (C) is not particularly limited, but is preferably at least one or more selected from the group consisting of metal oxides, metal nitrides, carbides, carbon-based materials, and metal hydroxides.

Examples of the metal oxides include iron oxide, zinc oxide, silicon oxide (silica), alumina, magnesium oxide, titanium oxide, cerium oxide, and zirconium oxide.

Examples of the metal nitrides include silicon nitride, aluminum nitride, gallium nitride, chromium nitride, tungsten nitride, magnesium nitride, molybdenum nitride, lithium nitride, and boron nitride.

Examples of the carbides include silicon carbide, boron carbide, aluminum carbide, titanium carbide, and tungsten carbide.

Examples of the carbon-based materials include diamond particles, carbon black, graphite, graphene, fullerenes, carbon nanotubes, and carbon nanofibers.

Examples of the metal hydroxides include aluminum hydroxide, calcium hydroxide, and magnesium hydroxide.

These thermally conductive fillers may be used singly, or two or more thereof may be used together.

From the viewpoint of enhancing the dispersibility in the resin composition by a surface treatment with the above-described compound (B) and easily improving the thermal conductivity, the thermally conductive filler (C) is preferably at least one or more selected from the group consisting of alumina, diamond, and aluminum nitride among those described above.

The average primary particle size of the thermally conductive filler (C) is not particularly limited, but is preferably 0.1 μm or larger and 250 μm or smaller, more preferably 0.2 μm or larger and 100 μm or smaller.

Note that the average primary particle size can be measured using, for example, “Laser Diffraction Particle Size Analyzer” manufactured by HORIBA, Ltd., and the particle size (d50) at which the cumulative volume reaches 50% can be defined as the average primary particle size.

The thermally conductive filler (C) preferably comprises two or more types of particles having different average primary particle sizes. When two or more types of particles having different average primary particle sizes are used, particles having a smaller average particle size get in between particles having a larger average particle size, thereby the thermally conductive filler is dispersed properly in the silicone resin or the silicone oil, making it easy to increase the filling rate of the thermally conductive filler.

Note that when two or more peaks appear in the particle size distribution of the thermally conductive filler, thereby it can be decided that the resin composition has two or more types of particles having different average primary particle sizes.

When the thermally conductive filler (C) comprises two or more types of particles having different average primary particle sizes, the specific particle sizes thereof can be selected according to the type of the thermally conductive filler. For examples, the thermally conductive filler is preferably a mixture of particles having an average primary particle size of 10 μm or larger and 250 μm or smaller (thermally conductive filler having a large particle size) and the thermally conductive filler having an average primary particle size of 0.1 m or larger and less than 10 μm (thermally conductive filler having a small particle size). Further, the thermally conductive filler having a large particle size also preferably comprises two or more types of particles having different primary particle sizes.

As the type of the thermally conductive filler (C), any of the above-described types of the thermally conductive filler can be used. Further, as described above, the thermally conductive filler is preferably at least one or more selected from the group consisting of alumina, diamond, and aluminum nitride.

<Alumina>

Alumina, when used as the thermally conductive filler (C), preferably comprises two or more types of particles having mutually different average primary particle sizes. When two or more types of particles having different average particle sizes are used, particles having a smaller average particle size get in between particles having a larger average particle size, thereby alumina is dispersed properly in the silicone resin, making it easy to increase the filling rate of alumina.

Alumina, when comprising two or more types of particles having different average primary particle sizes, is preferably a mixture of particles having an average primary particle size of 10 μm or larger and 250 μm or smaller (hereinafter, also referred to as "alumina having a large particle size") and particles having an average primary particle size of 0.1 μm or larger and less than 10 μm (hereinafter, also referred to as alumina having a small particle size).

When alumina comprises both of the alumina having a small particle size and the alumina having a large particle size, the mass ratio of the alumina having a large particle size to the alumina having a small particle size (large particle size/small particle size) is, for example, 0.1 or more and 50 or less, preferably 1 or more and 15 or less, more preferably 5 or more and 15 or less. Such a mass ratio makes it easy to fill alumina in the silicone resin or the silicone oil and makes the thermally conductive properties likely to be favorable.

The alumina having a large particle size more preferably has an average primary particle size of 12 μm or larger and 100 μm or smaller, still more preferably 15 μm or larger and 80 μm or smaller.

The alumina having a small particle size preferably has an average primary particle size of 0.2 μm or larger and 5 μm or smaller, preferably 0.2 μm or larger and 3 μm or smaller.

<Diamond>

Diamond, when used as the thermally conductive filler (C), preferably comprises two or more types of particles having mutually different average primary particle sizes. When two or more types of particles having different average particle sizes are used, particles having a smaller average particle size get in between particles having a larger average particle size, thereby diamond is dispersed properly in the silicone resin or the silicone oil, making it easy to increase the filling rate of diamond.

Diamond, when comprising two or more types of particles having different average primary particle sizes, is preferably a mixture of particles having an average primary particle size of 10 μm or larger and 250 μm or smaller (hereinafter, also referred to as "diamond having a large particle size") and particles having an average primary particle size of 0.1 μm or larger and less than 10 μm (hereinafter, also referred to as diamond having a small particle size).

When diamond comprises both of the diamond having a small particle size and the diamond having a large particle size, the mass ratio of the diamond having a large particle size to the diamond having a small particle size (large particle size/small particle size) is, for example, 0.5 or more and 20 or less, preferably 1 or more and 15 or less, more preferably 2 or more and 8 or less. Such a mass ratio makes it easy to fill diamond in the silicone resin or the silicone oil and makes the thermally conductive properties likely to be favorable.

The diamond having a large particle size more preferably has an average primary particle size of 15 μm or larger and 150 μm or smaller, still more preferably 18 μm or larger and 100 μm or smaller.

Note that the diamond having a large particle size preferably comprises two or more types of particles having different average primary particle sizes. This makes it easier to fill diamond in the silicone resin or the silicone oil and makes the thermal conductive properties likely to be more favorable.

The diamond having a small particle size preferably has an average primary particle size of 0.5 μm or larger and 8 μm or smaller, preferably 1 μm or larger and 5 μm or smaller. Further, the diamond having a small particle size preferably comprises two or more types of particles having different average primary particle sizes. This makes it easier to fill diamond in the silicone resin or the silicone oil and makes the thermal conductive properties likely to more favorable.

<Aluminum Nitride>

Aluminum nitride, when used as the thermally conductive filler (C), preferably comprises two or more types of particles having mutually different average primary particle sizes. When two or more types of particles having different average particle sizes are used, particles having a smaller average particle size get in between particles having a larger average particle size, thereby aluminum nitride is dispersed properly in the silicone resin, making it easy to increase the filling rate of aluminum nitride.

Aluminum nitride, when comprising two or more types of particles having different average primary particle sizes, is preferably a mixture of particles having an average primary particle size of 10 μm or larger and 250 μm or smaller (hereinafter, also referred to as "aluminum nitride having a large particle size") and particles having an average primary particle size of 0.1 μm or larger and less than 10 μm (hereinafter, also referred to as aluminum nitride having a small particle size).

When aluminum nitride comprises both of the aluminum nitride having a small particle size and the aluminum nitride having a large particle size, the mass ratio of the aluminum nitride having a large particle size to the aluminum nitride having a small particle size (large particle size/small particle size) is, for example, 0.2 or more and 20 or less, preferably 0.3 or more and 10 or less, more preferably 0.5 or more and 5 or less. Such a mass ratio makes it easy to fill aluminum nitride in the silicone resin and makes the thermally conductive properties likely to be favorable.

The aluminum nitride having a large particle size more preferably has an average primary particle size of 10 μm or larger and 100 μm or smaller, still more preferably 10 μm or larger and 80 μm or smaller.

Note that the aluminum nitride having a large particle size preferably comprises two or more types of particles having different average primary particle sizes. This makes it easier to fill aluminum nitride in the silicone resin or the silicone oil and makes the thermal conductive properties likely to be more favorable.

The aluminum nitride having a small particle size preferably has an average primary particle size of 1 μm or larger and 8 μm or smaller, preferably 2 μm or larger and 7 μm or smaller.

Note that the aluminum nitride having a small particle size may comprise two or more types of particles having different average primary particle sizes.

The amount of the thermally conductive filler in the case where the thermally conductive filler (C) is contained in the resin composition is preferably 60% by mass or more, more preferably 80% by mass or more, and still more preferably 90% by mass or more, based on the total amount of the resin composition. The amount of the thermally conductive filler being equal to or more than these lower limit values makes it easy to improve the thermal conductivity of the resin composition or a cured product thereof.

Further, the thermally conductive filler (C) of the present invention can be made into a surface-treated thermally conductive filer using the compound (B) as described above.

The surface-treated thermally conductive filler can be obtained by mixing the compound (B) and the thermally conductive filler (C). Further, a wet treatment method, a dry treatment method, or the like is preferably used from the viewpoint of making it easy to facilitate the surface treatment in mixing.

In the wet treatment method, the compound (B) may be bonded or allowed to adhere to the surface of the thermally conductive filler by, for example, adding the thermally conductive filler (C) into a solution obtained by dispersing or dissolving the compound (B) to mix the resultant mixture and then subjecting the mixture to a heating treatment.

The dry treatment method is a method of performing a surface treatment without using a solution and is specifically a method such that the compound (B) is bonded or allowed to adhere to the surface of the thermally conductive filler by mixing the thermally conductive filler (C) and the compound (B) to stir the resultant mixture with a mixer or the like and then subjecting the mixture to a heating treatment. Note that the surface treatment that is performed by mixing the thermally conductive filler (C) and the compound (B) can also be performed in the presence of the silicone resin or silicone oil (A), which will be described later.

The amount of the compound (B) to be used to be added is preferably 0.1 to 20 parts by mass, more preferably 0.5 to 15 parts by mass, and still more preferably 1 to 10 parts by mass, based on 100 parts by mass of the thermally conductive filler (C).

<Silicone Resin or Silicone Oil (A)>

The resin composition of the present invention comprises a silicone resin or a silicone oil (A), a compound (B), and a thermally conductive filler (C).

(Silicone Resin)

The type of the silicone resin is not particularly limited, but is preferably a condensation-curable silicone resin, an addition reaction-curable silicone resin, or the like, more preferably an addition reaction-curable silicone resin.

The addition reaction-curable silicone resin is preferably composed of a silicone compound that is a base resin and a curing agent that cures the base resin. The silicone compound that is used as a base resin is preferably an organopolysiloxane having an alkenyl group. Examples of the alkenyl group include C2-6 alkenyl groups, such as a vinyl group, an allyl group, a 1-butenyl group, and a 1-hexenyl group, and is, from the aspects of easiness of synthesis and costs, preferably a vinyl group. In addition, the silicone compound that is used as a base resin may have one or more alkenyl groups, but generally has two or more alkenyl groups.

Specific examples of the organopolysiloxane having an alkenyl group include organopolysiloxanes having vinyl at each end, such as a polydimethylsiloxane having vinyl at each end, a polyphenylmethylsiloxane having vinyl at each end, a dimethylsiloxane-diphenylsiloxane copolymer having vinyl at each end, a dimethylsiloxane-phenylmethylsiloxane copolymer having vinyl at each end, and a dimethylsiloxane-diethylsiloxane copolymer having vinyl at each end.

As the silicone compound that is used as a base resin, a silicone compound having a viscosity at 25° C. of, for example, 1000 mPa·s or lower may be used, and the viscosity is preferably 50 mPa·s or higher, more preferably 80 mPa·s or higher and 800 mPa·s or lower, still more preferably 100 mPa·s or higher and 500 mPa·s or lower.

The curing agent that is used for the addition reaction-curable silicone resin is not particularly limited as long as it can cure the above-described silicone compound that is a base resin, but is preferably an organohydrogenpolysiloxane, which is an organopolysiloxane having two or more hydrosilyl groups (SiH).

Examples of the organohydrogenpolysiloxane include a methylhydrosiloxane-dimethylsiloxane copolymer, polymethylhydrosiloxane, polyethylhydrosiloxane, and a methylhydrosiloxane-phenylmethylsiloxane copolymer. These may comprise but does not necessarily have to comprise a hydrosilyl group at an end.

The curing agent preferably has a viscosity at 25° C. of 1000 mPa·s or lower and preferably 50 mPa·s or higher, more preferably 100 mPa·s or higher and 900 mPa·s or lower, still more preferably 100 mPa·s or higher and 600 mPa·s or lower.

When the viscosity ranges of the above-described base resin and curing agent are set within the above-described ranges, thereby reducing the viscosity of the resin composition is made possible, and therefore the workability is made favorable. In addition, it is made easy to add a large amount of the thermally conductive filler in addition to dispersing the thermally conductive filler properly.

In addition, when the silicone resin is used, a curing catalyst is generally added. Examples of the curing catalyst include platinum catalysts, palladium catalysts, and rhodium catalysts, and the curing catalyst is preferably a platinum catalyst among these. The curing catalyst is a catalyst for curing a silicone compound and a curing agent which are raw materials for the silicone resin. The amount of the curing catalyst to be added is usually 0.1 to 200 ppm, preferably 0.5 to 100 ppm, based on the total mass of the silicone compound and the curing agent.

The silicone resin may be either a one-liquid curable silicone resin or a two-liquid curable silicone resin. In the case of the two-liquid curable silicone resin, the resin composition may be prepared by mixing the first liquid comprising the above-described base resin and the second liquid comprising the curing agent. Note that in the case of the two-liquid curable silicone resin, the thermally conductive filler (C) and the compound (B) may be contained in one of the first liquid and the second liquid or may be contained in both of the first liquid and the second liquid.

When the silicone oil is used, it is desirable to use the compound represented by formula (1) and the compound represented by formula (2) together as the compound (B) from the viewpoint of exhibiting effects more than in the case where either one of the compounds is used alone and being capable of suppressing voids which occur when the resin composition is left standing at a high temperature after being applied, and using the compounds together is effective for a one-liquid non-curable heat radiation compound.

(Silicone Oil)

The silicone oil is preferably a non-reactive silicone oil not having a reactive group, such as an alkoxy group or a silanol group, in the molecule.

Examples of the silicone oil include a straight silicone oil and a modified silicone oil, and the silicone oil is preferably a straight silicone oil.

Examples of the straight silicone oil include polyorganosiloxanes, such as a dimethyl silicone oil and a phenyl methyl silicone oil.

Examples of the modified silicone oil include a polyether-modified silicone oil, an aralkyl-modified silicone oil, a fluoroalkyl-modified silicone oil, a long-chain alkyl-modified silicone oil, a higher fatty acid ester-modified silicone oil, a higher fatty acid amide-modified silicone oil, and a phenyl-modified silicone oil.

The silicone oil preferably has a viscosity at 25° C. of 20 mPa·s or higher and 500 mPa·s or lower, more preferably 50 mPa·s or higher and 300 mPa·s or lower, still more preferably 80 mPa·s or higher and 150 mPa·s or lower.

The content of the silicone resin or silicone oil (A) is preferably 0.1 to 30 parts by mass, more preferably 0.5 to 20 parts by mass, still more preferably 1 to 15 parts by mass, based on 100 parts by mass of the thermally conductive filler (C).

As described above, the resin composition of the present invention is a resin composition comprising a silicone resin or a silicone oil (A), a compound (B), and a thermally conductive filler (C). The order of adding these respective components is not particularly limited, and the resin composition can be prepared by mixing all these components. In this case, when the compound (B) adheres to or reacts with the surface of the thermally conductive filler (C) in the composition, thereby the dispersibility of the thermally conductive filler to the silicone resin or the silicone oil is enhanced.

Further, the resin composition may be prepared by mixing the compound (B) and the thermally conductive filler (C) firstly to allow the compound (B) to adhere to or react with the surface of the thermally conductive filler (C) and then further mixing the silicone resin or the silicone oil.

Furthermore, as described above, the resin composition may be prepared by mixing the first liquid and the second liquid which are prepared in advance. In preparing the first liquid and the second liquid, each liquid may also be prepared by mixing the respective components in the same manner.

In addition to the resin composition comprising all of (A) to (C) described above, the present invention can also provide a resin composition comprising a silicone resin or a silicone oil (A) and a compound (B). The resin composition comprising a silicone resin or a silicone oil (A) and a compound (B) can be used as a composition for filling a thermally conductive filler, and the resin composition to which a thermally conductive filler (C) is appropriately added can be used.

If necessary, the resin composition of present invention may comprise additives, such as an antioxidant, a heat stabilizer, a colorant, a fire retardant, and an antistatic agent.

A heat radiation member formed with a resin composition can be prepared using the resin composition of the present invention as a raw material. For example, a heat radiation member formed into a predetermined shape can be made by making the resin composition into a predetermined shape and then curing the resin composition by appropriately performing heating or the like.

The heat radiation member can be used inside electronic devices, and, for example, an electronic device comprising an electronic component and a heat radiation member disposed on the electronic component can be made. Specifically, heat generated from an electronic component can effectively be radiated by disposing the heat radiation member between the electronic component, such as a semiconductor device, and a heat sink.

EXAMPLES

Hereinafter, the present invention will be made clear by giving specific Examples of the present invention and Comparative Examples. Note that the present invention is not limited to the following Examples.

Methods of evaluating samples prepared in Examples and Comparative Examples are as follows. Note that the extent of physical property changes at a high temperature was evaluated by a "rate of change in hardness" in the case where a silicone resin was used as the component (A), or by a "rate of change in viscosity" or a "rate of change in piercing load" in the case where a silicone oil is used as the component (A).

[Rate of Change in Hardness]

The rate of change in hardness was determined from the initial hardness of a cured product of each resin composition prepared in Examples and Comparative Examples and the hardness after a heating treatment at 150° C. for 200 hours according to the following equation.

Rate of change in hardness (%)=[(hardness after heating treatment−initial hardness)/initial hardness]×100

Note that the measurement of the hardness was performed with an automatic hardness measuring apparatus, "GX-02E" manufactured by TECLOCK Co., Ltd.

[Rate of Change in Viscosity]

The rate of change in viscosity was determined from the viscosity in the initial state of each resin composition prepared in Examples and Comparative Examples and the viscosity after a heating treatment at 150° C. for 200 hours according to the following equation.

Rate of change in viscosity (%)=[(viscosity after heating treatment−viscosity in initial state)/viscosity in initial state]×100

Note that the viscosity was measured with a Brookfield viscometer type B at 23° C.

As a measuring apparatus, "HB DVE" manufactured by EKO INSTRUMENTS CO., LTD. was used.

[Rate of Change in Piercing Load]

The rate of change in piercing load was determined from the piercing load in the initial state of each resin composition prepared in Examples and Comparative Examples and the piercing load after a heating treatment at 150° C. for 200 hours according to the following equation.

Rate of change in piercing load (%)=[(piercing load after heating treatment−piercing load in initial state)/piercing load in initial state]×100

The piercing load was determined by measuring the load at the time when a needle reached a depth of 6 mm from the surface after piercing the needle into each sample.

Note that the measurement of the piercing load was conducted with a piercing load measuring machine, Digital Force Gauge "ZTS-5N" manufactured by IMADA CO., LTD., under a condition such that the indentation was performed at a needle diameter of 1 mmϕ, the indentation speed of 10 mm/min, and the set temperature at 23° C.

[Thermal Conductivity]

The thermal conductivity was measured at 23° C. in accordance with ASTM D5470.

The measurement was conducted with a measuring apparatus "T3Ster DynTIM Tester" manufactured by Mentor, a Siemens Business.

[Consistency]

Measurement was conducted using a ¼ cone in accordance with JIS K-2220.

[Void Ratio]

The resin composition in the form of a paste applied in an amount of 0.5 g on an aluminum substrate was pressed with a glass plate in such a way that the thickness was 1 mm, and then the resin composition was stored at 150° C. for 24 hours in a state of being fixed with the glass plate. The void ratio was calculated by dividing the area where voids occurred and observed after the storage by the whole area of the resin composition in the form of a paste.

<Criteria>

Determination of the void ratio was performed according to the following criteria.

A . . . Void ratio is 10% or less

B . . . Void ratio is more than 10% and 15% or less

C . . . Void ratio is more than 15% and 20% or less

Components used in Examples and Comparative Examples are as follows.

<Component (A): Silicone Resin>

Addition reaction type silicone resin

Base resin . . . Organopolysiloxane having vinyl at each end (having a viscosity at 25° C. of 300 mPa·s)

Curing agent . . . Organohydrogenpolysiloxane (having a viscosity at 25° C. of 400 mPa·s)

<Component (A): Silicone Oil>

Polyorganosiloxane (having a viscosity at 25° C. of 110 mPa·s)

<Compound (B)>

A "treatment agent 1" and a "treatment agent 2" as the compound represented by formula (1), and a "treatment agent 5" as the compound represented by formula (2) were produced as follows and used.

[Production of Treatment Agent 1]

The treatment agent 1 was obtained by reacting "KBM-503" manufactured by Shin-Etsu Silicone. and "MCR-H11" manufactured by Gelest, Inc. in the presence of a hydrosilylation catalyst. The reaction temperature was set to 150° C., the reaction time was set to 0.5 hours, and the amount of "KBM-503" added was 1 mol to 1 mol of "MCR-H11."

[Formula 14]

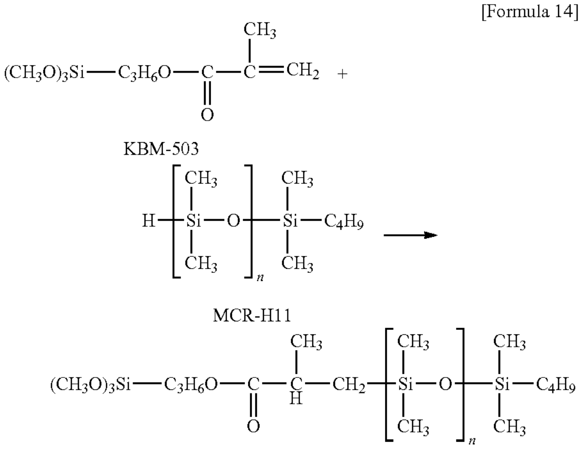

Treatment agent 1 wherein n represents 5 to 6.

[Production of Treatment Agent 2]

The treatment agent 2 was produced using "MCR-H21" manufactured by Gelest, Inc. in place of MCR-1H11 in the production of the treatment agent 1. Note that the treatment agent 2 is a compound such that n in the structure of the treatment agent 1 represents 60 to 80.

[Production of Treatment Agent 5]

Production was performed using "DMS-H21" in place of "MCR-H11" manufactured by Gelest, Inc. in the production of the treatment agent 1 in such a way as to form the following structure. Note that n in this structure represents 60 to 80.

[Formula 15]

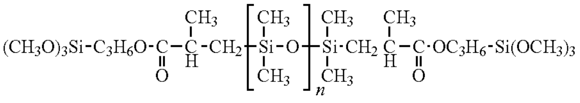

The treatment agents 1, 2, and 5 were identified by $^{29}$Si-NMR and $^{1}$H-NMR.

$^{29}$Si-NMR ($CDCl_3$):

δ 8.33 to 7.82 ppm ($CH_2SiMe_2O$—),
−7.23 to −7.51 ppm ($HSiMe_2O$—),
−19.73 to −20.24 ppm (—$OSiMe_2O$—),
−42.56 to −42.97 ppm ($Si(OMe)_3$), $^{1}$H-NMR ($CDCl_3$):

δ 4.70 to 4.66 ppm (m, 1H, HSi),
3.56 ppm (s, 9H, $Si(OCH_3)_3$),
2.58 to 2.42 ppm (m, 1H, $OOCCH(CH_3)$),
1.09 to 0.56 ppm (m, 4H, $Si(CH_3)_2Si$),
0.17 to 0.02 ppm (m, 18H, $Si(CH_3)_2O$).

The structures of compounds used in Comparative Examples are as follows.

[Treatment Agent 3]

[Formula 16]

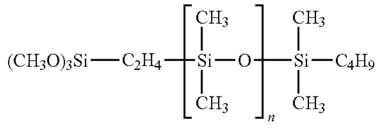

Treatment agent 3 wherein n represents 8 to 10.

[Treatment Agent 4]

A treatment agent 4 is a compound such that n in the structure of the treatment agent 3 represents 60 to 80.

[Decyltrimethoxysilane]

[Formula 17]

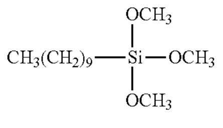

<Component (C): Thermally Conductive Filler>

<Alumina>

"Alumina 1" average particle size 40 μm
"Alumina 2" average particle size 13 μm
"Alumina 3" average particle size 0.5 μm
"Alumina 4" average particle size 3 μm <Diamond>

"Diamond 1" average particle size 3 μm
"Diamond 2" average particle size 7 μm

"Diamond 3" average particle size 10 μm

"Diamond 4" average particle size 20 μm

"Diamond 5" average particle size 40 μm

"Diamond 6" average particle size 70 μm

"Diamond 7" average particle size 50 μm

<Aluminum Nitride>

"Aluminum nitride 1" average particle size 50 μm

"Aluminum nitride 2" average particle size 30 μm

"Aluminum nitride 3" average particle size 10 μm

"Aluminum nitride 4" average particle size 5 μm

Note that the average particle sizes of alumina 1 to 4, diamond 1 to 7, and aluminum nitride 1 to 4 refer to average primary particle sizes.

Example 1

The compound (B) as a dispersant and the thermally conductive filler (C) were added according to the number of parts to be added shown in Table 1, to 5.2 parts by mass of the organopolysiloxane (having a viscosity at 25° C. of 300 mPa·s) composing the base resin of the addition reaction type silicone resin and having vinyl at each end, and 1.5 parts by mass of a reaction retarder and a catalytic amount of a platinum catalyst were further added, and thus a first liquid of a resin composition was prepared.

Further, the compound (B) as a dispersant and the thermally conductive filler (C) were added according to the number of parts to be added shown in Table 1, to 5.2 parts by mass of the organohydrogenpolysiloxane (having a viscosity at 25° C. of 400 mPa·s) composing a curing agent for the addition reaction type silicone resin, and thus a second liquid of the resin composition was prepared.

The first liquid and the second liquid were mixed in a mass ratio (first liquid/second liquid) of 1:1, the resultant mixture was then poured into a metal mold, and heating at 70° C. for 1 hour was performed in order to allow the curing reaction to progress. The resultant cured product of the resin composition was stored at 23° C. for 12 hours, and the hardness at the time when a change in hardness was not observed was evaluated as the initial hardness of the cured product of the resin composition.

Examples 2 to 6 and Comparative Examples 1 to 7

A cured product of a resin composition was obtained in the same manner as in Example 1, except that the types and amounts of the respective components added were changed as shown in Table 1.

Examples 7 to 19 and Comparative Examples 8 to 14

A resin composition in the form of a paste was prepared by mixing the silicone oil, the thermally conductive filler, and the dispersant in a combination shown in Table 2. The evaluations were performed assuming that the state after heating the resin composition at 150° C. for 1 hour and leaving it to stand at 23° C. for 12 hours was the initial state.

Examples 20 to 24

A resin composition in the form of a paste was prepared by mixing the silicone oil, the thermally conductive filler, and the dispersant in a combination shown in Table 3. The consistency, and the void ratio after 24 hours at 150° C. were calculated for the prepared resin composition.

TABLE 1

| | | | Example | | | | | | Comparative Example | | | | | | |
|---|---|---|---|---|---|---|---|---|---|---|---|---|---|---|---|
| | | | 1 | 2 | 3 | 4 | 5 | 6 | 1 | 2 | 3 | 4 | 5 | 6 | 7 |
| Resin composition (parts by mass) | Resin | Silicone resin | 5.2 | 5.2 | 8.6 | 8.6 | 13.5 | 13.5 | 5.2 | 5.2 | 8.6 | 8.6 | 13.5 | 13.5 | 13.5 |
| | Alumina | Alumina 1 | | | | | | | | | | | | | |
| | | Alumina 2 | 90 | 90 | | | | | 90 | 90 | | | | | |
| | | Alumina 3 | 10 | 10 | | | | | 10 | 10 | | | | | |
| | | Alumina 4 | | | | | | | | | | | | | |
| | Diamond | Diamond 1 | | | 11 | 11 | | | | | 11 | 11 | | | |
| | | Diamond 2 | | | 30 | 30 | | | | | 30 | 30 | | | |
| | | Diamond 3 | | | | | | | | | | | | | |
| | | Diamond 4 | | | | | | | | | | | | | |
| | | Diamond 5 | | | 40 | 40 | | | | | 40 | 40 | | | |
| | | Diamond 6 | | | 13 | 13 | | | | | 13 | 13 | | | |
| | | Diamond 7 | | | 7 | 7 | | | | | 7 | 7 | | | |
| | Aluminum nitride | Aluminum nitride 1 | | | | | 40 | 40 | | | | | 40 | 40 | 40 |
| | | Aluminum nitride 2 | | | | | 25 | 25 | | | | | 25 | 25 | 25 |
| | | Aluminum nitride 3 | | | | | 20 | 20 | | | | | 20 | 20 | 20 |
| | | Aluminum nitride 4 | | | | | 15 | 15 | | | | | 15 | 15 | 15 |
| | Compound | Treatment agent 1 | 1.3 | | 2.2 | | 3.4 | | | | | | | | |
| | | Treatment agent 2 | | 1.3 | | 2.2 | | 3.4 | | | | | | | |
| | | Treatment agent 3 | | | | | | | 13 | | 2.2 | | 3.4 | | |
| | | Treatment agent 4 | | | | | | | | | | | | 3.4 | |
| | | Decyltrimethoxysilane | | | | | | | | 1.3 | | 2.2 | | | 3.4 |
| Evaluation | | Thermal conductivity (W/mK) | 5.0 | 4.8 | 4.8 | 4.8 | 4 | 4 | 4.9 | 5.1 | 4.7 | 4.8 | 3.9 | 3.8 | 4 |
| | | Hardness initial | 37 | 38 | 22 | 59 | 44 | 38.1 | 22 | 15.2 | 17 | 9.4 | 35.8 | 18.2 | 23 |
| | | Hardness after heating treatment | 57 | 42.3 | 35 | 64 | 65 | 48 | 57 | 54 | 57 | 65.6 | 73 | 38 | 76 |
| | | Rate of change in hardness (%) | 54 | 11 | 59 | 8 | 48 | 26 | 159 | 255 | 235 | 598 | 104 | 109 | 230 |

TABLE 2

| | | | Example | | | | | | | | | |
|---|---|---|---|---|---|---|---|---|---|---|---|---|
| | | | 7 | 8 | 9 | 10 | 11 | 12 | 13 | 14 | 15 | 16 |
| Resin composition (parts by mass) | Resin | Silicone oil | 8.6 | 13.5 | 11.2 | 14.4 | 5.2 | 8.6 | 13.5 | 11.2 | 14.4 | 5.2 |
| | Alumina | Alumina 1 | | | | 16 | 90 | | | | 16 | 90 |
| | | Alumina 2 | | | 30 | 96 | | | | 30 | 96 | |
| | | Alumina 3 | | | 50 | | 10 | | | 50 | | 10 |
| | | Alumina 4 | | | | 48 | | | | | 48 | |
| | Diamond | Diamond 1 | 11 | | | | | 11 | | | | |
| | | Diamond 2 | 30 | | | | | 30 | | | | |
| | | Diamond 3 | | | 20 | | | | | 20 | | |
| | | Diamond 4 | | | 50 | | | | | 50 | | |
| | | Diamond 5 | 40 | | | | | 40 | | | | |
| | | Diamond 6 | 13 | | | | | 13 | | | | |
| | | Diamond 7 | 7 | | 100 | | | 7 | | 100 | | |
| | Aluminum nitride | Aluminum nitride 1 | | 40 | | | | | 40 | | | |
| | | Aluminum nitride 2 | | 25 | | 12 | | | 25 | | 12 | |
| | | Aluminum nitride 3 | | 20 | | 24 | | | 20 | | 24 | |
| | | Aluminum nitride 4 | | 15 | | 4 | | | 15 | | 4 | |
| | Compound | Treatment agent 1 | 2.2 | 3.4 | 2.8 | 3.6 | | | | | | |
| | | Treatment agent 2 | | | | | 1.3 | 2.2 | 3.4 | 2.8 | 3.6 | 0.65 |
| | | Treatment agent 3 | | | | | | | | | | |
| | | Treatment agent 4 | | | | | | | | | | |
| | | Treatment agent 5 Decyltrimethoxysilane | | | | | | | | | | 0.65 |
| Evaluation | | Thermal conductivity (W/mK) | 4.2 | 3.2 | 3.0 | 3.0 | 4.3 | 4.6 | 3.0 | 3.0 | 1.0 | 4.3 |
| | | Viscosity before heating (Pa * s) | — | — | — | — | 320 | — | — | — | — | — |
| | | Viscosity after 150° C. for 200 h (Pa * s) | — | — | — | — | 330 | — | — | — | — | — |
| | | Piercing load before heating (mN) | 20 | 15 | 55 | 5 | — | 5 | 20 | 15 | 2 | 180 |
| | | Piercing load after 150° C. for 200 h (mN) | 22 | 20 | 55 | 5 | — | 5 | 20 | 35 | 2 | 180 |
| | | Rate of change before and after heating [%] | 10 | 33 | 6 | 0 | 3 | 0 | 0 | 133 | 0 | 0 |

| | | | Example | | | Comparative Example | | | | | | |
|---|---|---|---|---|---|---|---|---|---|---|---|---|
| | | | 17 | 18 | 19 | 8 | 9 | 10 | 11 | 12 | 13 | 14 |
| Resin composition (parts by mass) | Resin | Silicone oil | 8.6 | 11.2 | 14.4 | 8.6 | 14.4 | 5.2 | 8.6 | 7.2 | 11.2 | 14.4 |
| | Alumina | Alumina 1 | | | 16 | | 16 | 90 | | | | 16 |
| | | Alumina 2 | | 30 | 96 | | 96 | | | | 30 | 96 |
| | | Alumina 3 | | 50 | | | | 10 | | | 50 | |
| | | Alumina 4 | | | 48 | | 48 | | | | | 48 |
| | Diamond | Diamond 1 | 11 | | | 11 | | | 11 | | | |
| | | Diamond 2 | 30 | | | 30 | | | 30 | | | |
| | | Diamond 3 | | 20 | | | | | | | 20 | |
| | | Diamond 4 | | 50 | | | | | | | 50 | |
| | | Diamond 5 | 40 | | | 40 | | | 40 | | | |
| | | Diamond 6 | 1.3 | | | 13 | | | 13 | | | |
| | | Diamond 7 | 7 | 100 | | 7 | | | 7 | | 100 | |
| | Aluminum nitride | Aluminum nitride 1 | | | | | | | | | | |
| | | Aluminum nitride 2 | | | 12 | | 12 | | | 30 | | 12 |
| | | Aluminum nitride 3 | | | 24 | | 24 | | | 60 | | 24 |
| | | Aluminum nitride 4 | | | 4 | | 4 | | | 10 | | 4 |
| | Compound | Treatment agent 1 | | | | | | | | | | |
| | | Treatment agent 2 | 1.1 | 1.4 | 1.8 | | | | | | | |
| | | Treatment agent 3 | | | | 2.2 | 3.6 | | | | | |
| | | Treatment agent 4 | | | | | | 1.3 | 2.2 | 1.8 | 2.8 | 3.6 |
| | | Treatment agent 5 Decyltrimethoxysilane | 1.1 | 1.4 | 1.8 | | | | | | | |
| Evaluation | | Thermal conductivity (W/mK) | 4.6 | 3.0 | 3.0 | 4.2 | 3.0 | 4.2 | 4.2 | 3.0 | 2.8 | 1.0 |
| | | Viscosity before heating (Pa * s) | — | — | — | — | — | 320 | — | — | — | — |
| | | Viscosity after 150° C. for 200 h (Pa * s) | — | — | — | — | — | 340 | — | — | — | — |
| | | Piercing load before heating (mN) | 20 | 120 | 40 | 4 | 5 | — | 7 | 10 | 30 | 1 |
| | | Piercing load after 150° C. for 200 h (mN) | 50 | 120 | 40 | 61 | 14 | — | 24 | 18 | 770 | 2 |
| | | Rate of change before and after heating [%] | 150 | 0 | 0 | 1425 | 180 | 6 | 243 | 80 | 2467 | 100 |

TABLE 3

| | | | Example | | | | |
|---|---|---|---|---|---|---|---|
| | | | 20 | 21 | 22 | 23 | 24 |
| Resin composition (parts by mass) | Resin | Silicone oil | 5.2 | 5.2 | 5.2 | 5.2 | 5.2 |
| | Alumina | Alumina 1 | 90 | 90 | 90 | 90 | 90 |
| | | Alumina 2 | | | | | |
| | | Alumina 3 | 10 | 10 | 10 | 10 | 10 |
| | | Alumina 4 | | | | | |
| | Compound | Treatment agent 1 | | | | | |
| | | Treatment agent 2 | 1.3 | | 0.26 | 0.65 | 1.04 |
| | | Treatment agent 3 | | | | | |
| | | Treatment agent 4 | | | | | |
| | | Treatment agent 5 | | 1.3 | 1.04 | 0.65 | 0.26 |
| | | Decyltrimethoxysilane | | | | | |
| Evaluation | | Consistency | 280.0 | 250.0 | 260.0 | 270.0 | 280.0 |
| | | Void ratio | C | A | A | B | C |

When comparison is made between Examples and Comparative Examples for the resin compositions in which the type and amount added of the thermally conductive filler are the same, it is found that the rates of change in physical properties are smaller in the Examples than in the Comparative Examples. Further, regarding especially the compound (B) which is contained in the silicone oil, by using the compound having a trialkoxy group at each end of the silicone chain, as shown in the structure represented by formula (2), a resin composition having more excellent performance can be obtained. It is found from this that the resin composition of the present invention using the compound (B) having a particular structure has favorable thermally conductive properties and small physical property change rates at a high temperature.

The invention claimed is:

1. A resin composition comprising:

a silicone resin or a silicone oil (A);

a compound (B) represented by the following formula (1) or (2); and a thermally conductive filler (C):

(1)

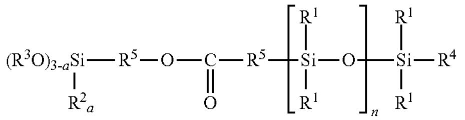

(2)

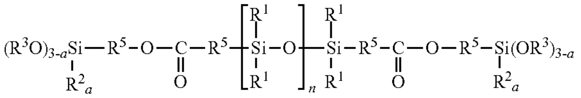

in the formulas (1) and (2), $R^1$ represents a C1-20 alkyl group, a C2-20 alkenyl group, or a C6-20 aryl group, a plurality of $R^1$s are optionally the same or different, $R^2$ represents a C1-4 alkyl group, when a plurality of $R^2$s are present, the plurality of $R^2$s are optionally the same or different, $R^3$ represents a C1-4 alkyl group, a C2-4 alkoxyalkyl group, or a C2-4 alkenyl group or acyl group, when a plurality of $R^3$'s are present, the plurality of $R^3$s are optionally the same or different, $R^4$ represents a C1-8 alkyl group, $R^5$ represents a C2-20 alkylene group, a plurality of $R^5$s are optionally the same or different, a represents an integer of 0 to 2, and n represents an integer of 4 to 150.

2. The resin composition according to claim 1, wherein the thermally conductive filler (C) is at least one or more selected from the group consisting of metal oxides, metal nitrides, carbides, carbon-based materials, and metal hydroxides.

3. The resin composition according to claim 1, wherein the thermally conductive filler (C) is at least one or more selected from the group consisting of alumina, diamond, and aluminum nitride.

4. The resin composition according to claim 1, wherein the thermally conductive filler (C) comprises two or more types of particles having different average particle sizes.

5. The resin composition according to claim 1, wherein the silicone resin (A) is an addition reaction-curable silicone resin.

6. A compound (B) represented by the following formula (1) or (2):

(1)

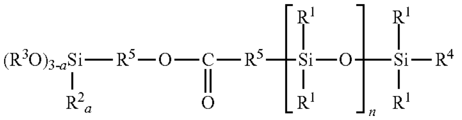

(2)

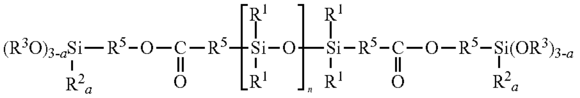

in the formulas (1) and (2), $R^1$ represents a C1-20 alkyl group, a C2-20 alkenyl group, or a C6-20 aryl group, a plurality of R's are optionally the same or different, $R^2$ represents a C1-4 alkyl group, when a plurality of $R^2$s are present, the plurality of $R^2$s are optionally the same or different, $R^3$ represents a C1-4 alkyl group, a C2-4 alkoxyalkyl group, or a C2-4 alkenyl group or acyl group, when a plurality of $R^3$s are present, the plurality of $R^3$s are optionally the same or different, $R^4$ represents a C1-8 alkyl group, $R^5$ represents a C2-20 alkylene group, a plurality of $R^5$s are optionally the same or different, a represents an integer of 0 to 2, and n represents an integer of 4 to 150.

7. A dispersant comprising the compound (B) according to claim 6.

8. A thermally conductive filler surface-treated with the compound (B) according to claim 6.

9. A resin composition comprising:

a silicone resin or a silicone oil (A); and the compound (B) according to claim 6.

10. A heat radiation member formed with the resin composition according to claim 1.

11. An electronic device comprising:

an electronic component; and the heat radiation member according to claim 9, disposed on the electronic component.

* * * * *